Patented Oct. 11, 1938

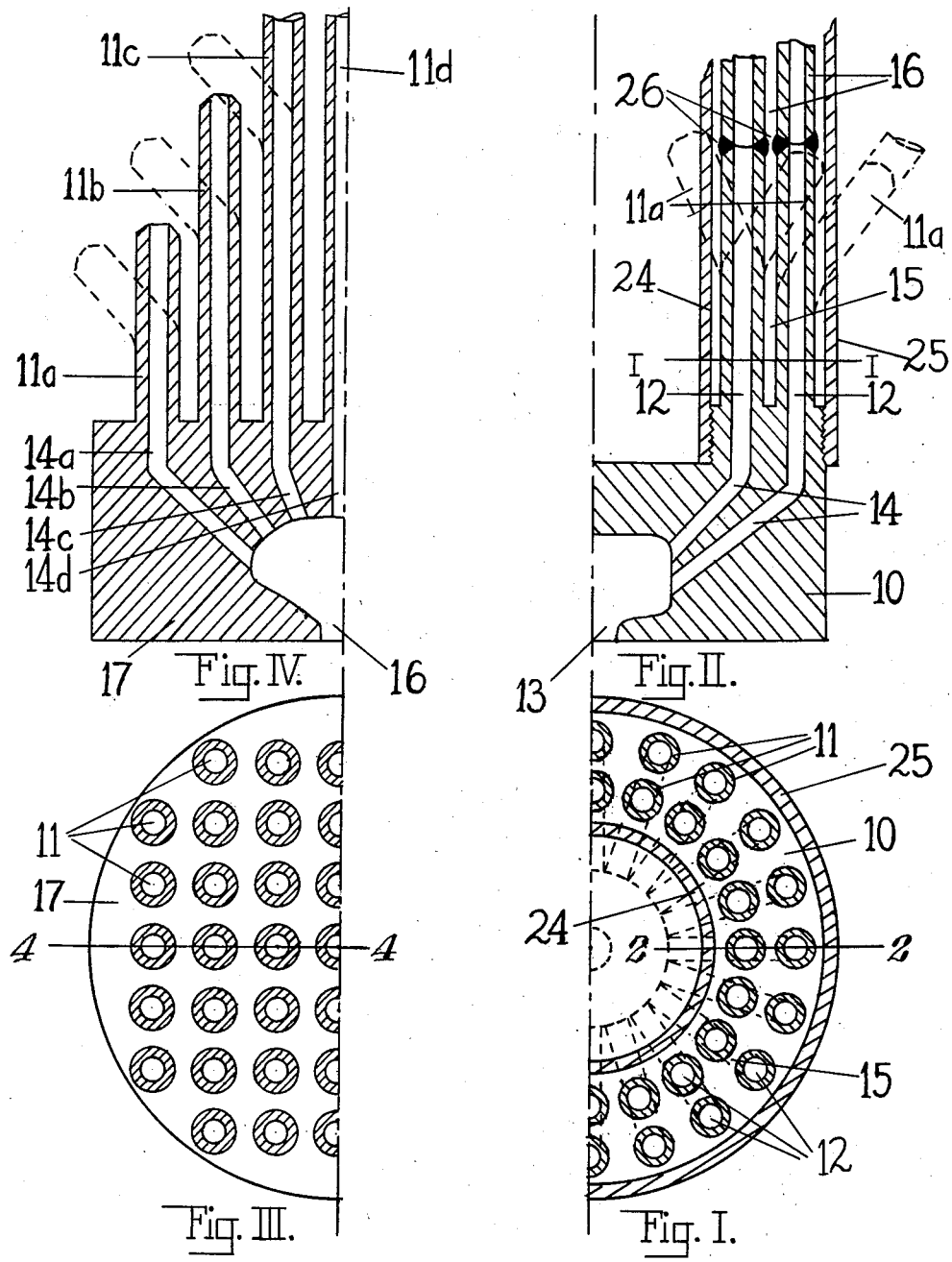

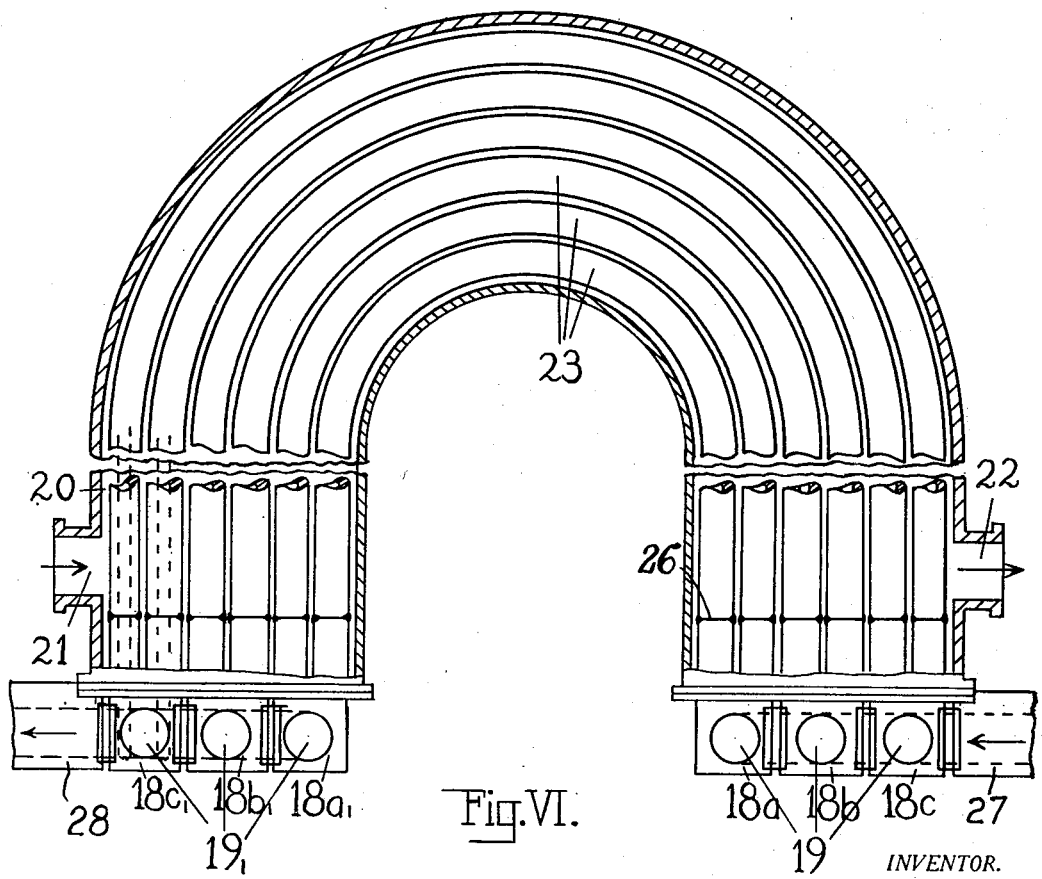

2,133,249

UNITED STATES PATENT OFFICE 2,133,249

HIGH PRESSURE HEAT EXCHANGER

Charles Phillips Kerr, Washington, D. C., assignor to E. I. du Pont de Nemours & Company, Wilmington, Del., a corporation of Delaware Application July 14, 1933, Serial No. 680,356
Renewed April 19, 1938

6 Claims. (Cl. 257—224)

This invention relates to heat exchangers adapted for fluids which are under any desired pressure ranging from low to extremely high pressures; the apparatus herein described being especially useful for heating gases and their mixtures to or cooling them from high temperatures, under high pressures, such as are encountered in the various high pressure catalytic synthesis processes, e. g. the synthesis of ammonia from its elements, the synthesis of alcohol from carbon monoxide and hydrogen, etc.

My apparatus is, however, readily adapted for the lower temperatures and pressures and for any process or operation where heated fluids or their mixtures are to be used, such, for example, as tubular evaporators, waste heat boilers, superheaters, etc. or other such heat exchange apparatus.

The principal object of the invention is to provide an extremely efficient apparatus of the character in question. Another object is to provide an apparatus of such character which is simple, compact, and relatively inexpensive to construct. A still further object of the invention is to provide an apparatus which can be fabricated with ease, containing a plurality of tubular members disposed in a relatively small space. These and other objects of my invention will be hereinafter referred to and the novel combinations of elements whereby said objects may be attained will be hereinafter more fully considered.

My invention is capable of embodiment in many different forms, and, for the purpose of illustration, I shall describe in the accompanying drawings several forms of apparatus made in accord therewith in which, like parts are designated by the same characters throughout,—

Figure I is a plan view in half-section of one modification of my apparatus, taken along plane I—I of Figure II;

Figure II is a cross-sectional elevation of the apparatus shown in Figure I and taken along the plane 2—2 of Figure I;

Figure III is a diagrammatic plan view of a half-section of another modification of my invention;

Figure IV is a diagrammatic cross-sectional elevation taken along the plane 4—4 of Figure III;

Figure V is a plan view of a modified form of header;

Figure VI is a diagrammatic cross-sectional elevation showing a plurality of the headers illustrated in Figure V connected by tubes.

There are a number of problems involved in the design of heat exchange apparatus for the transfer of heat from a liquid to a gas, for example. It is well known that on the liquid side the transfer rate is affected principally by the velocity of the liquid and cleanliness, while cleanliness in turn is affected by the velocity of the liquid. The problem, therefore, becomes one of proper spacing of the elements which conduct, for example, the gas thru the liquid. If tubes are this medium, they must be close enough together so that the cross-sectional area of the liquid passage around the tubes will be reduced and a satisfactory water velocity secured. Unless the tubes are thus spaced close together a high water velocity cannot be obtained except by the use of baffles or some similar expedient, and such methods are complex, inconvenient, and have other disadvantages, such as difficult assembly, leakage, high maintenance cost, etc. In the construction of such apparatus, therefore, it is very desirable to space the tubes or other elements close together.

Where low gas pressures are handled, fairly close tube or other element spacing can be secured by rolling the tubes or other elements into a tube sheet, but this method is impracticable where high gas pressures are involved. This is true not so much because it is difficult to roll a high pressure tube into a tube sheet and obtain thereby a joint between the tube and the sheet which is kept tight, but because the resulting tube sheet exposes a relatively large area to the high pressures; and any large area under high pressure demands walls or structural members of great strength to withstand the large aggregate forces developed. Consequently, with high pressures it is essential to keep the gas confined always in passages of small diameter with preferably small areas exposed to the high pressures.

One feature of my invention involves the preparation of heat exchangers and equivalent apparatus having passage elements or tubes extremely close together which can be constructed readily and with a relatively low cost. I have found that this can be readily accomplished by making the tube connections to the header integral with the header and welding the exchanger tubes proper on to the connections by bending them into positions where the welds can be easily made; by constructing the apparatus in this manner the tubes can be placed as close together as is desired. The only limitation on the tube spacing is the thickness of the saw or other machine cutter necessary for cutting out the tube segments. My manner of effecting this construction will now be more fully particularized.

In Figure I, which is a half-sectional plan view of a header block which has been machined from a circular block of steel, the tube connections, which will hereinafter be designated tube segments, 11, are sawed or machined from the block after the holes 12 have been drilled. In the base of the circular header 10 the fluid conducting space 13 is machined, through this space conduits 14 lead the fluid into the holes 12 in each tube segment. It is evident that the annular space 15, Figure II, between the two rows of tube segments 11, is so small, as cut from the header block, that it would be impossible to properly weld enchanger tubes to the segments. I accomplish this result by heating the tube segments 11 to a suitable temperature and then bending them to a position permitting easy access as indicated in Figure II by the dotted tube segments 11—A, in which position the exchanger tubes 16 may be easily and quickly welded to them; weld shows at 26. When the exchanger tubes 16 have been welded into position the tube segments 11—A are again heated, if necessary, and then with the attached exchanger tubes forced back into their original position. By this method it will be seen that it is immaterial how small the annular space 15 or the spaces between adjacent tubes are, for by my method of bending the tube segments from position, welding on the exchanger tubes, and then returning them to their original position, no difficulties are encountered in obtaining a perfectly sound weld between the exchanger tubes 16 and the tube segments 11. Thus tube banks can be made having tubes very closely packed even when they are fabricated of thick walled high pressure resisting materials.

My invention, of course, is not limited to the construction of a heat exchanger, such as that described in Figures I and II, but innumerable modifications, all of which embody the same principles of construction, are likewise within the scope of my invention.

Figures III and IV illustrate diagrammatically another modification of my invention. It will be noted in the structure that the tube segments 11 increase in height from the periphery to the center of the circular header 17, this being done to facilitate the attachment of the exchanger tubes. The tubes are attached in a manner analogous to that explained under the descriptions of Figures I and II. Tube segment 11—A is first heated and then bent away from tube segment 11—B, tube segment 11—B is then heated and bent away from tube segment 11—C, the remaining tube segments being heated and bent successively. The center-most tube segment 11—D, which need not be bent, is then welded to its exchanger tube, not shown, the exchanger tubes are then welded or otherwise attached to the tube segment adjacent to the central one and after being attached these assembled tubes are returned, after heating if necessary, to their normal operating position. The tube segments of the next succeeding row are then bent and welded to their respective tubes and the assembled tube segments and tubes forced after heating back into position; in succession the other tubes in the bank are welded onto their respective tube segments and the assembly positioned in the header block. It, of course, is immaterial from the standpoint of operability of my apparatus how the passages are made, leading to the completed tubes. In Figures III and IV a central conduit 16 distributes the fluid to the conduits 14—a, 14—b, 14—c and 14—d, respectively, which deliver the liquid to the correspondingly numbered tubes 11—a, 11—b, 11—c, and 11—d, respectively.

It is to be understood that a solid header such as that shown in Figure III may be of any desired shape, it not being necessary to have the header in a circular form as shown in this figure. A rectangular or other shaped header can be used if desired and the tube segments machined from it in any shape or size. It will be noted from the geometrical design of Figure III that the machining of the various tube segments from the block 17 is not particularly difficult. After machining the various steps from the outer row of tube segments to the inner row the steps being determined by the height of the rows of tubes, the first and outer row of tubes in each half section providing the first and the lowest step the center row the top step, a hole is bored for each tube segment and the tube segments are then separated from one another by successively separating each row thereof by sawing or machining between each with a band saw or miller having a thickness corresponding approximately to the desired space between the tubes. Any other suitable means, of course, may be employed for forming the tube segments on the header block.

It is more or less difficult to machine or mold into a single header block the plurality of tubes such as are indicated in Figure IV in the manner described and I have found that by machining a double bank of tubes in a rectangular block any number of tubes may be assembled in a single bank by uniting a plurality of such blocks without the difficulties attendant upon machining, casting, or otherwise forming the individual tube segments in a one piece header block.

Figure V illustrates a rectangular block containing a double row of tube segments. When preparing the headers in this manner the tube segments may be of equal height and the fluid passage may enter the header block 18 from any desired position therein. As indicated in this drawing the distributing conduit 19, indicated by the dotted line in this plan view, leads the fluid to each row of the tube segments. Note the faciliity with which the tube segments may be machined from the tube block 18 by merely sawing thru the block 18 in the manner shown, and milling or drilling out the triangular pieces left after sawing thru the block in the manner indicated.

Figure VI indicates the assemblage of three header blocks 18—a, b, c, and 18—$a_1$, $b_1$, $c_1$, similar to the blocks shown in Figure V resulting in a tubular heat exchanger having a bank of thirty tubes. This heat exchanger is assembled by first welding a tube to each of the 10 tube segments of the header block 18—a, in the manner described above, similarly welding a tube to each of the 10 tube segments of the header block 18—$a_1$, preparing 10 tube segments bent U-shaped, and welding each of these U-shaped segments, at each end to the two appropriate tube segments already welded to the tube segments of the two header blocks 18—a and 18—$a_1$, thus forming a U-shaped assembly. The header block 18—b is then placed in position beside the header block 18—a with tubes attached thereto, the other ends of which are attached to the header block 18—$b_1$ which is positioned beside header block 18—$a_1$. In an analogous manner tubes are welded into position in blocks 18—c and 18—$c_1$; the header blocks 18—a, b, and c are then clamped together as are also their corresponding header blocks 18—a₁, b₁, and c₁. A main fluid distributing conduit 27 is provided for the admission of fluid to the distributing conduits 19 and one 28 for withdrawing the thermally treated fluid from the distributing conduits 19₁. A suitable shell 20 is then positioned about the assembled tubes with a fluid inlet at 21 and a fluid outlet at 22. The operation of this heat exchanger is described as an auxiliary apparatus in ammonia synthesis. The fluid, for example, a nitrogen-hydrogen gaseous mixture from the ammonia synthesis, passes into the distributor headers 19 and up through the thirty heat exchanger tubes 23,—during their passage through these tubes they give up their heat content to the water flowing countercurrent in the space between the tubes,—the water entering the shell 20 thru the inlet 21 and leaving the shell thru the outlet 22. The cooled nitrogen-hydrogen mixture then passes from the heat exchanger tubes 23 into the headers 19₁ and out thru the collecting conduit 28.

The high efficiency of a heat exchanging apparatus of this type can readily be appreciated by the fact that the very small cavities between the tubes results in an extremely high velocity of the heat transferring fluid flowing about them, which in turn results in an exceedingly thin surface film outside the tubes 23 with a resulting rapid transfer of heat. In an actual operating unit which may be roughly illustrated by the diagrammatic sketch shown in Figure VI the overall heat transfer coefficients were found to vary from 106 to 160 large centigrade heat units per hour per square foot per degree centigrade, based upon the logarithmic mean of the inside and outside surface areas of the tubes for the ranges of temperature of gas and water used, while equipment formerly considered to be ideal for similar purposes gave only 50 large centigrade heat units per hour per square foot per degree centigrade determined on a similar basis. The surprising increase in heat transfer efficiency of my apparatus is not only theoretically apparent but has actually been demonstrated.

Figure VI illustrates a heat exchanger in which the tubes are in a U-shape which aids in compensating for expansion. It is, of course, not essential that such a shape be used, for it is immaterial to the efficiency of my apparatus whether the tubes between the headers be formed in a U-form, zigzag-form, or passed in a straight path from the lower to the upper header or any other preferred or desired shape. An especially efficient and readily built design adaptable to many uses is that shown in Figures I and II; the tube segments 11 and tubes after being welded together are surrounded by pipes 24 and 25, the tubes 16 being positioned in two circles within the annulus formed between the pipes 24 and 25. One fluid is then caused to flow in the cavities about the tubes, while the other fluid is passed through the header 13 distributing tubes 14 and then directly into the tubes 16.

Further examples of the flexibility of design which my invention permits are illustrated by the many types of heat exchangers that may be constructed about the header shown in Figure I. A heat exchanger may be constructed, for example, which would contain any number of tubes with two header blocks, one above the other, for straight or zigzag tubes, or, if U-shaped tubes are to be used, one beside the other, the space about the tubes being enclosed by the tube pipes 24 and 25, which, of course, are straight if the headers are placed one above the other or shaped, to the proper degree, if the U-shaped or zigzag tubes are used. It is, of course, likewise possible that for the construction of certain heat exchange devices, evaporators, and the like, it may be found expedient to construct one of the headers of a given shape and the other of another shape, for example, the lower header might well be a circular header with a single row of tubes around its periphery and the upper header an extended rectangular header receiving these tubes. Furthermore, in many types of construction it may be found preferable to thread the top of each tube segment to receive a suitable threaded sector machined into or attached to the tube or any other suitable method of attaching the tubes may be used, although I generally prefer to effect the connection by welding. Numerous modifications will readily suggest themselves to the skilled engineer in this art.

While the small space about the tubes generally gives sufficiently high velocity of the fluid in that space, nevertheless, if desired, baffles such as discs or spirals may be placed about the tubes in the space and thereby increase still further the turbulent flow of the fluid in that space and at the same time lower still further the surface film on the outside of the tubes.

In a heat exchanging device in which a liquid is employed to heat or cool gas it is well known that the gas film is affected greatly by the mass velocity of the gas. It is, therefore, desirable to increase the gas flow as much as is expedient, considering, among other things, the cost in pressure drop. In apparatus constructed in accord with my invention it is permissible to go as far as desired for the tubes can be made in a U or other form and thus theoretically any pressure drop desired may be realized. Another outstanding advantage coupled with the high efficiency and excellent flexibility of my apparatus is the ease with which headers of any desired shape may be formed to fit into restricted areas.

It is, of course, also understood that the methods of headering which are illustrated and described are applicable not only to an arrangement in which the tube bundles are each enclosed in their individual jackets, such as indicated in Figure VI, but are equally useful in apparatus in which the tube bundle or a number of tube bundles are used in a large shell, such as would be employed in evaporators, waste heat boilers, or other such heat exchange apparatus. In any case, by the use of apparatus designed in accord with this invention a decided advantage is derived by being able to get close tube spacing with the resulting compact arrangement and efficient operation.

It will be appreciated from the above description that any apparatus constructed in accord with my invention for use in heat exchangers, evaporators, boilers, etc. and particularly when employed in high pressure synthesis equipment will come within the scope of my invention without sacrificing any of the advantages that may be derived therefrom.

I claim:

1. In a device for imparting heat to fluids a header block comprising a plurality of annular rows of tube segments integral with the header block and containing gas passages, the height of the tube segments varying from the innermost to the outermost segment.

2. In a device for imparting heat to fluids a circular header block comprising a plurality of annular rows of tube segments integral with and covering the face of the header block, the header block and each segment thereof containing a gas passage, the height of the tube segments varying from the innermost to the outermost segment.

3. In a device for imparting heat to fluids a circular header block comprising a plurality of annular rows of tube segments integral with the header block and containing gas passages, the height of the tube segments varying from the innermost to the outermost segment on a decreasing scale.

4. In a device for imparting heat to fluids a circular header block comprising a plurality of annular rows of tube segments integral with the header block and annularly arranged on the face of the header block, the header block and each tube segment containing a gas passage, the height of the tube segments varying from the innermost to the outermost segments.

5. A device for imparting heat to fluids comprising in combination the header block of claim 1 with tubes fixed to each tube segment.

6. A device for imparting heat to fluids comprising in combination the header block of claim 1 with tubes fixed to the tube segments thereof which tubes are at their opposite ends fixed to the tube segments of another header block similar to the first.

CHARLES PHILLIPS KERR.